(12) United States Patent
Kritzler et al.

(10) Patent No.: US 10,395,499 B2
(45) Date of Patent: Aug. 27, 2019

(54) SYSTEMS AND METHODS FOR MONITORING USE OF PERSONAL PROTECTIVE EQUIPMENT

(71) Applicant: Siemens Aktiengesellschaft, Munich (DE)

(72) Inventors: Mareike Kritzler, San Francisco, CA (US); Florian Michahelles, Berkeley, CA (US); Carl Martin Backman, Göteborg (SE); Anders Tenfalt, Göteborg (SE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 15/544,632

(22) PCT Filed: Jan. 21, 2016

(86) PCT No.: PCT/US2016/014220
§ 371 (c)(1),
(2) Date: Jul. 19, 2017

(87) PCT Pub. No.: WO2016/118690
PCT Pub. Date: Jul. 28, 2016

(65) Prior Publication Data
US 2018/0012470 A1    Jan. 11, 2018

Related U.S. Application Data

(60) Provisional application No. 62/106,379, filed on Jan. 22, 2015.

(51) Int. Cl.
*G08B 21/02* (2006.01)
*G06Q 50/26* (2012.01)
*G06Q 10/00* (2012.01)

(52) U.S. Cl.
CPC ............. *G08B 21/02* (2013.01); *G06Q 10/00* (2013.01); *G06Q 50/265* (2013.01)

(58) Field of Classification Search
CPC ............................. G06Q 50/265; G08B 21/02
See application file for complete search history.

(56) References Cited

U.S. PATENT DOCUMENTS

| 8,212,653 B1 | 7/2012 | Dempsey et al. |
| 2004/0088780 A1* | 5/2004 | Bachar .................. A41D 13/00 2/457 |

(Continued)

FOREIGN PATENT DOCUMENTS

| WO | 20090032417 A1 | 3/2009 |
| WO | 20110085441 A1 | 7/2011 |

OTHER PUBLICATIONS

International Search Report dated Apr. 14, 2016; International Application No. PCT/US2016/014220; Filing Date: Jan. 21, 2016; 12-pages.

(Continued)

*Primary Examiner* — Sisay Yacob

(57) ABSTRACT

A personal protective equipment (PPE) monitoring system is disclosed that includes a set of wireless transmitting devices and a mobile application executable on a mobile device. The mobile device receives a wireless signal from a transmitting device associated with a workstation and determines the type of workstation based on an identifier included in the wireless signal. The mobile device also receives wireless signals from transmitting devices attached to PPE items located in proximity to the mobile device and determines the types of PPE items based on respective identifiers included in the wireless signals. The mobile application determines PPE items required to operate equipment at the workstation and further determines whether the set of detected PPE items includes all of the required PPE items. The mobile applica- (Continued)

tion generates a user interface that indicates the presence or absence of each required PPE item and displays the UI on the mobile device.

15 Claims, 7 Drawing Sheets

(56) References Cited

U.S. PATENT DOCUMENTS

| | | | |
|---|---|---|---|
| 2004/0100384 A1* | 5/2004 | Chen | G07C 9/00111 340/572.1 |
| 2009/0032417 A1 | 2/2009 | Liu | |
| 2011/0085441 A1 | 4/2011 | Poonawalla et al. | |
| 2011/0115629 A1* | 5/2011 | Holler | G06Q 10/00 340/572.1 |
| 2012/0326837 A1* | 12/2012 | Ajay | A61F 9/029 340/5.2 |
| 2015/0169922 A1* | 6/2015 | Krepel | G06K 7/10366 340/10.1 |
| 2015/0248635 A1* | 9/2015 | Salcedo | G06Q 10/08 705/28 |
| 2015/0284231 A1* | 10/2015 | Grant | B66F 17/006 182/19 |
| 2016/0232758 A1* | 8/2016 | Fletcher | G08B 3/10 |

OTHER PUBLICATIONS

European Report of Examination dated Apr. 23, 2019; European Patent Application No. 16704099.7; Filing Date: Jan. 21, 2016; 8 pages.

\* cited by examiner

SYSTEMS AND METHODS FOR MONITORING USE OF PERSONAL PROTECTIVE EQUIPMENT

CROSS-REFERENCE TO RELATED APPLICATIONS

This application claims priority to U.S. Provisional Application No. 62/106,379 filed on Jan. 22, 2015, the content of which is incorporated herein in its entirety.

BACKGROUND

Accidents that occur in the workplace environment can result in significant physical harm to employees and place a financial burden on employers. Proper use of personal protective equipment (PPE) can, in many instances, provide effective protection against such accidents. Laws and regulations have been instituted to ensure that PPE is used in a proper manner in the workplace, and the Occupational Safety and Health Administration (OSHA) is the federal agency that is tasked with ensuring compliance with these laws and regulations. An employer is responsible for ensuring that the proper PPE is available for use and being used properly by workers, and failure to comply with OSHA regulations can lead to significant monetary and reputational harm for an employer as well as blacklisting. Existing methods for ensuring compliance with workplace safety regulations suffer from various drawbacks. Described herein are technical solutions that address at least some of these drawbacks.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
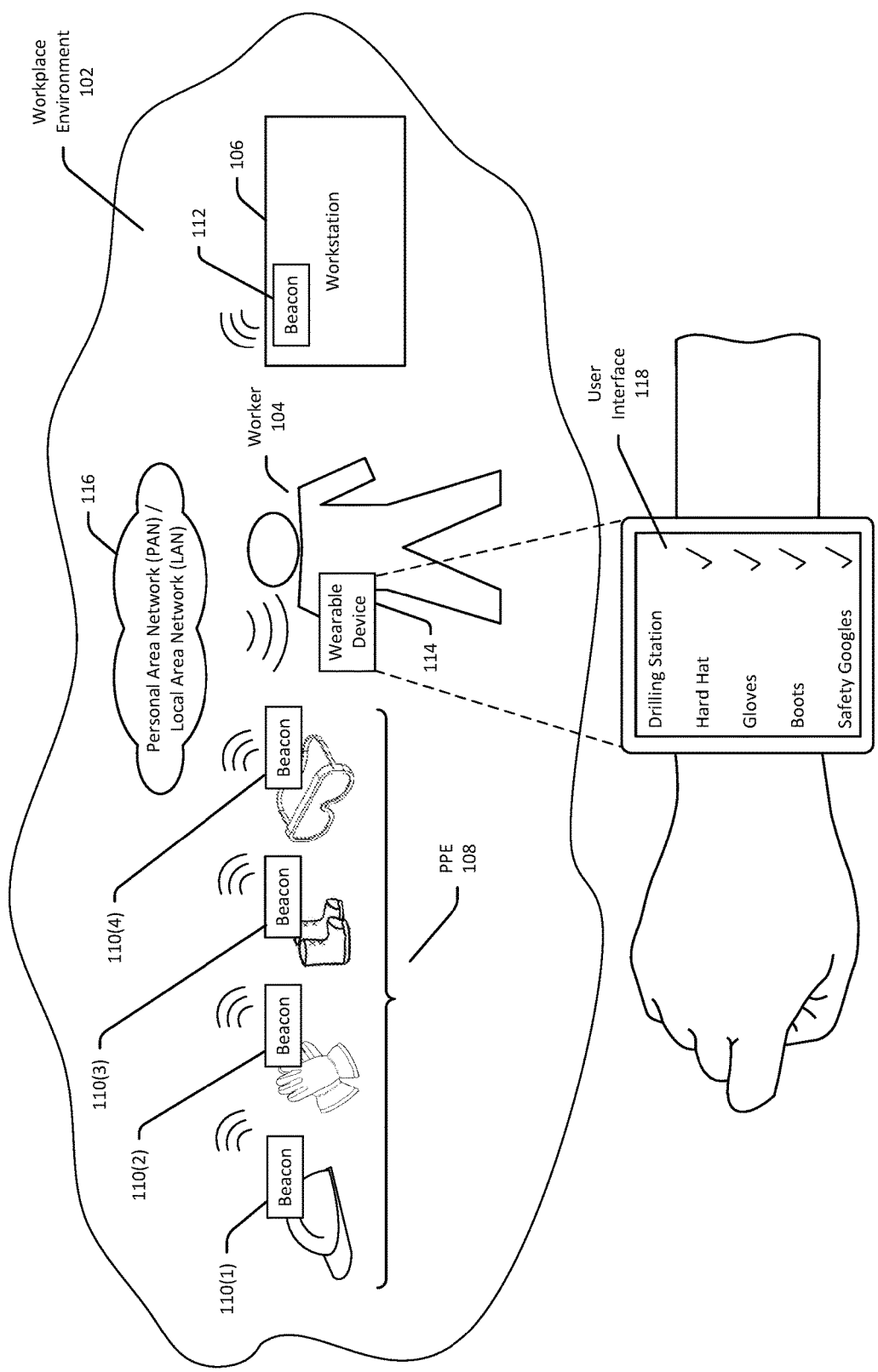
FIGS. 1A-1B schematically illustrate an example operation of a context-aware PPE monitoring system in accordance with one or more example embodiments of the disclosure, according to which the presence of all PPE items designated as being required for a first workstation are detected when a worker is in proximity to the first workstation and san indication that all required PPE items have been detected is presented to the worker via a user device, and after the worker moves in proximity to a second workstation, all PPE items designated as being required for the second workstation continue to be detected and an indication that all required PPE items have been detected is once again presented to the worker via the user device.

This disclosure relates to, among other things, devices, systems, methods, computer-readable media, techniques, and methodologies for determining PPE items that have been designated as being required in order to operate equipment at a workstation located in a workplace environment, periodically or continuously detecting whether all required PPE items are present in proximity to a worker who is located in proximity to the workstation, and presenting an indication of the presence or absence of required PPE items via a user device utilized by the worker. Example embodiments of the disclosure may be implemented by a PPE monitoring system. The PPE monitoring system may include a set of wireless transmitting devices, an application (e.g., a mobile application) executable on a user device (e.g., a wearable device), and/or one or more back-end servers.

In certain example embodiments, a respective wireless transmitting device may be associated with each PPE item available for use by a worker in a workplace environment. A PPE item may be any garment or equipment that is designed to protect the wearer's body from injury or infection by introducing a barrier between the wearer and a working environment. PPE items may include, without limitation, clothing, helmets, goggles, and so forth. PPE may be categorized as protective clothing, which may include traditional categories of clothing (e.g., suits, boots, etc.), and protective gear, which may include items such as pads, guards, shields, masks, helmets, googles, and so forth.

In certain example embodiments, each wireless transmitting device may be attached, affixed, or otherwise physically associated in any suitable manner to a corresponding PPE item. The wireless transmitting devices may include any device capable of transmitting, and optionally receiving, wireless signals in accordance with any suitable wireless communication protocol. For example, a wireless transmitting device may be a low-energy Bluetooth beacon that transmits wireless signals in accordance with a Bluetooth wireless communication standard (or more specifically, the Bluetooth Low Energy (BLE) protocol); a device that transmits wireless signals in accordance with a Near Field Communication (NFC) standard; a device that transmits wireless signals in accordance with any of the Institute of Electrical and Electronics Engineers (IEEE) 802.11 wireless communication standards including Wi-Fi Direct (a communication standard that enables devices to communicate with each other without requiring a wireless access point); and so forth. Further, in certain example embodiments, a wireless transmitting device may be a passive Radio Frequency Identification (RFID) tag or an active RFID tag that includes a local power source.

A wireless transmitting device in accordance with example embodiments of the disclosure may include, without limitation, an antenna for transmitting/receiving wireless signals, a power source, data storage (e.g., non-volatile and/or volatile memory), and a microcontroller (e.g., a microprocessor). The microcontroller may be configured to execute a set of executable instructions (e.g., firmware) residing in the data storage to perform various operations. For example, the microcontroller may execute firmware to cause the wireless transmitting device to emit a wireless signal that includes an identifier that identifies the PPE item to which the device is attached. A wireless transmitting device in accordance with example embodiments of the disclosure may broadcast the aforementioned wireless signal continuously, periodically, and/or transmit the wireless signal in response to a probe signal received from, for instance, a wearable device of a worker.

As an example, each wireless transmitting device may emit a wireless signal that includes an identifier linked to a particular type of PPE item. As a more specific example, wireless transmitting devices physically associated with safety googles may emit wireless signals that include an identifier linked to safety googles, whereas wireless transmitting devices physically associated with safety helmets may emit wireless signals that include an identifier linked to safety helmets.

In other example embodiments, each wireless transmitting device may emit a wireless signal that includes an identifier that uniquely identifies a particular PPE item. For example, a wireless signal emitted by a particular wireless transmitting device may include an identifier that uniquely identifies a particular PPE item (e.g., safety googles assigned to Worker A). In this manner, wireless transmitting devices may be used to identify PPE items that are personalized for a particular worker, and thereby identify, as will be described in more detail later in this disclosure, instances in which a worker may be utilizing the proper type of PPE item, but an improper specific PPE item that is not tailored to that particular worker. For example, a PPE monitoring system in accordance with example embodiments of the disclosure may be able to detect when Worker A is utilizing Worker B's gloves rather than his/her own, which may present a safety hazard if Worker B's gloves do not properly fit Worker A's hands.

An identifier may be linked to a particular type of PPE item or a specific PPE item itself as a result of being stored in a same data record as another identifier of the PPE item or as a result of being stored in a first data record that is linked to a second data record that stores another identifier of the PPE item. For example, the identifier 012345 may be linked to a character string that identifies a particular type of PPE item (e.g., "safety googles). As another example, the identifier 45678 may be linked to the character string "safety googles" that identifies a type of PPE item, and may be further linked to the character string "John Doe" that identifies the user to whom the specific PPE item has been assigned. For example, respective data fields of a same data record (or two or more linked data records) may be populated with the identifier 45678, the character string "safety googles," and the character string "John Doe."

As yet another example, an identifier retrieved from a wireless signal transmitted by a wireless transmitting device may include different segments that respectively identify a type of the PPE item to which the wireless transmitting device is attached and a worker to whom the PPE item has been assigned. More specifically, for example, the identifier 12340001 may include a first portion "1234" that identifies the PPE item as "boots" and a second portion "0001" that is a user identifier that identifies a particular user to whom the PPE item has been assigned. It should be appreciated that the above examples for constructing and storing identifiers that identify a type of a PPE item and/or the particular PPE item itself are merely illustrative and not exhaustive.

In certain example embodiments, a respective wireless transmitting device may also be associated with each workstation in a workplace environment. For example, a wireless transmitting device may be attached or affixed to a piece of equipment associated with a workstation. As with PPE items, a wireless transmitting device located at a workstation may emit a wireless signal that includes an identifier that identifies the type of workstation. For example, the wireless signal emitted by a wireless transmitting device located at a workstation may identify the workstation as an assembly station. In certain example embodiments, the wireless signal emitted by a wireless transmitting device may uniquely identify a particular type of equipment capable of being operated at the workstation. For example, the wireless signal may include an identifier that uniquely identifies a welding machine at a welding station. It should be appreciated that in other example embodiments, the wireless signal may include an identifier that uniquely identifies a particular workstation or a particular piece of equipment located at a particular position in the workplace environment. It should further be appreciated that, as with PPE items, an identifier included in a wireless signal may uniquely identify a particular workstation, a particular type of workstation, a particular piece of equipment, or a particular type of equipment operable at a workstation by virtue of being stored in a same data record as another identifier associated with the workstation or the equipment (e.g., a character string representative of a name and/or location of the workstation or equipment) or as a result of being stored in a first data record that is linked to a second data record that stores another identifier of the workstation or the type of equipment.

In accordance with example embodiments of the disclosure, a worker may utilize a user device configured to receive wireless signals from various wireless transmitting devices in a workplace environment. The user device may be configured to launch an application that includes computer-executable instructions, code, or the like that responsive to execution by one or more processing units of the user device causes various operations to be performed. While example embodiments of the disclosure may be described herein in connection with a wearable device (e.g., a smartwatch, smart glasses, etc.) and a mobile application executable on the wearable device, it should be appreciated that the user device may include, without limitation, other types of user devices such as a smartphone, a tablet, a personal digital assistant, a laptop computer, or the like, and the application may include, without limitation, other types of applications such as a thin client application (e.g., a web-based application), a thick client application, or the like. In addition, in certain example embodiments, the application may be a mobile application that is executable on a smartphone or tablet device and that is configured to communicate with a wearable device to output—via the wearable device—data that is generated or received by the mobile application (e.g., display a user interface (UI) on the wearable device; output audio data; provide haptic feedback, or the like).

In example embodiments of the disclosure, a microcontroller of a wearable device may execute computer-executable instructions to perform operations including receiving a wireless signal from a first wireless transmitting device; determining that the wireless signal includes an identifier that corresponds to a particular workstation, type of workstation, piece of equipment, or type of equipment; determining a set of one or more PPE items designated as being required to operate the equipment to which the identifier corresponds or utilize equipment associated with the workstation to which the identifier corresponds (referred to herein as required PPE items); receiving one or more additional wireless signals from one or more additional wireless transmitting devices; determining that each additional wireless signal includes a respective identifier that corresponds to a particular type of PPE item or to a particular PPE item itself (referred to herein as detected PPE items); determining whether the detected PPE items include all of the required PPE items; and generating and presenting, via the user device, a UI that indicates whether all required PPE items are present (e.g., the presence or absence of each required PPE item). It should be appreciated that while example processing, such as processing to detect PPE items in proximity to a worker, processing to determine a workstation or piece of equipment in proximity to the worker, processing to determine whether detected PPE items include all required PPE items for the workstation, or the like, may be described herein as being performed by an application (e.g., a mobile application) executable on a user device (e.g., a wearable device), such processing may be performed by one or more back-end servers with which the application is configured to communicate or may be performed in a distributed, parallel manner between back-end server(s) and the mobile application.

In certain example embodiments, the mobile application executing on the wearable device may determine a signal strength (e.g., a received signal strength indicator (RSSI) value) of a wireless signal received by the wearable device. If the RSSI value satisfies a threshold value, the mobile application may determine that the wireless transmitting device from which the wireless signal is received is in proximity to the wearable device, and thus, in proximity to the worker wearing the wearable device. Depending on the implementation, a first value may satisfy a second value if the first value meets or exceeds the second value or if the first value meets or falls below the second value. For example, if the wireless transmitting device is attached to a PPE item, the mobile application may assume that the worker is wearing the PPE item if the RSSI value satisfies the threshold value, or alternatively, may assume that the worker is not wearing the PPE item if the RSSI value does not satisfy the threshold value. Similarly, if the wireless transmitting device is associated with a workstation (e.g., attached to a piece of equipment operable at the workstation), the mobile application may assume that the worker is in close enough proximity to the workstation to operate equipment at the workstation if the RSSI value satisfies the threshold value, and conversely, may assume that the worker is not in close enough proximity to the workstation to operate equipment if the RS SI value does not satisfy the threshold value. The threshold value may correspond to a threshold distance (e.g., 1 meter) from the wearable device. Accordingly, if an RSSI value of a received wireless signal satisfies the threshold value, it may indicate that the wearable device is within the threshold distance from the wireless transmitting device from which the wireless signal was received, and thus, within the threshold distance from the workstation, workstation equipment, or PPE item with which the wireless transmitting device is physically associated.

In certain example embodiments, one or more sensors including, without limitation, an accelerometer, a gyroscope, a thermal sensor, a force sensor, or the like may be attached or affixed to a PPE item in addition to the wireless transmitting device. The wireless transmitting device may be further configured to receive sensor data collected by these sensor(s) and transmit the sensor data to the mobile application. The mobile application may be configured to process the sensor data to determine—with potentially greater accuracy than using the signal strength of the wireless signal received from the wireless transmitting device alone—whether the PPE item is currently being worn by the worker or is merely in close proximity to the worker. For example, if the accelerometer or gyroscope data is indicative of continuous movement for at least a threshold period of time, the mobile application may determine that the PPE item is being worn. In contrast, if the accelerometer or gyroscope data indicates no movement for at least the threshold period of time, the mobile application may determine that the PPE item is not being worn. It should be appreciated that the above examples are merely illustrative and not exhaustive and that sensor data from any number of sensors may be used in addition to, or in lieu of, a signal strength of the wireless signal received from the wireless transmitting device to determine whether the PPE item is currently being worn by a worker.

In those example embodiments in which a required PPE item is not included among the detected PPE item(s), the PPE monitoring system may initiate any of a variety of safety actions. For example, the mobile application may instruct the wearable device to transmit a wireless signal that causes an alarm (e.g., an audible alarm) to sound at the workstation. The alarm may inform an individual (e.g., a safety compliance officer) in the workplace environment of a potential PPE-related safety violation. In certain example embodiments, the wearable device may transmit the signal directly to a receiving component at the workstation (which may be the wireless transmitting device or another device) or may transmit the signal to a back-end server via, for example, a local area network (LAN), and the back-end server may, in turn, send a signal to a workstation receiving component to cause the alarm to sound.

As another example safety action that may be initiated, the mobile application may transmit an alert message to a computer at the workstation for presentation to one or more workers present at the workstation. The alert message may include textual, graphical, audio, and/or video content. The alert message may indicate which required PPE item(s) have not been detected and the worker to whom the alert message relates. The mobile application may determine the worker based on the user profile that is logged into the mobile application on the wearable device. In other example embodiments, the mobile application may transmit a notification to a back-end server that identifies the workstation and the PPE item(s) that were not detected, and the back-end server may transmit the alert message to the computer at the workstation.

As yet another example of a safety action that may be initiated, the PPE monitoring system may cause equipment at the workstation to become inoperable. For example, upon receipt of the alert message described earlier, a protocol may be initiated to disable all equipment at the workstation. The equipment may be disabled until a subsequent message is received that indicates that all required PPE items have been detected or that the non-compliant worker is no longer within proximity to the workstation. A worker may be determined to no longer be within proximity to the workstation if, for example, a wireless signal from a wireless transmitting device at the workstation is no longer being received by the wearable device of the non-compliant worker or the signal strength of any such received wireless signal does not satisfy a threshold value. In other example embodiments, if a workstation includes different pieces of equipment for which different combinations of PPE items have been designated as required, only those piece(s) of equipment for which at least one required PPE item has not been detected may be disabled. For example, a welding station may include different equipment for performing different types of welding (e.g., arc welding vs. gas welding). Different types of PPE items may be required to operate the different equipment. For example, full face protection from either a welding helmet or a hand shield may be required for arc welding whereas filter lenses with safety googles may be used in place of a welding helmet for gas welding where the intensity of the light generated is less than in arc welding. In this manner, a worker may continue to operate equipment for which all required PPE items have been detected even if the workstation includes additional equipment for which all required PPE items have not been detected. It should be appreciated that the above examples of safety actions that may be initiated are merely illustrative and not exhaustive.

In certain example embodiments, safety metric data may be collected by the various instances of the mobile application executing on the wearable devices of different workers. The safety metric data for any given worker may indicate, without limitation, the number of workstation visits during which the worker was compliant with PPE requirements (e.g., the number of instances in which all required PPE items were detected when the worker was determined to be in proximity to a workstation); the number of workstation visits during which the worker was non-compliant with PPE requirements (e.g., the number of instances in which at least one required PPE item was not detected when the worker was within proximity to a workstation); identification of the workstation corresponding to each compliant workstation visit; identification of the workstation corresponding to each non-compliant workstation visit; identification of those PPE item(s) that were not detected during each non-compliant workstation visit; a number of instances in which a previously undetected required PPE item was subsequently detected within a threshold period of time after providing an indication of the missing required PPE item via the wearable device used by the worker; a number of instances or a percentage of time that a PPE item was not being worn by the worker (as potentially determined from additional sensor data as described earlier); and so forth. While certain metrics have been described above as being represented by integer values, it should be appreciated that any suitable representation (e.g., percentage of workstation visits during which a worker was compliant with PPE requirements) may be used for any metric.

The safety metric data may be made accessible to the worker via the mobile application executable on the wearable device. In certain example embodiments, other workers may be incentivized to comply with PPE use requirements by rewarding those workers who demonstrate higher rates of compliant use of PPE with increased income, more vacation days, or the like. Additionally, or alternatively, the safety metric data may be processed to determine safety trends, correlate PPE use to workplace incident rates, generate reports, or the like. Further, safety metric data may be aggregated across all workers and presented to the workers in an anonymous format so as to indicate overall compliance with PPE use requirements without providing an indication of the particular compliance rates of any particular worker.

In addition, in certain example embodiments, a database storing relationships between workstations and required PPE items for the workstations may be dynamically or periodically updated as laws or regulations change. For example, if OSHA issues a regulation indicating that a new type of PPE item is required for a particular type of workstation, the database may be updated to indicate this. Conversely, if a particular type of PPE item is no longer required for a particular type of workstation, the database may be updated to remove this relationship.

Example embodiments of the disclosure include or yield various technical features, technical effects, and/or improvements to technology. For example, in accordance with example embodiments of the disclosure, a PPE monitoring system is disclosed that enables context-aware, real-time monitoring of the availability and use of PPE by workers in a workplace environment. More specifically, through the use of wireless transmitting devices, each of which is physically associated with a corresponding PPE item or workstation equipment and configured to communicate with a user device utilized by a worker (e.g., a wearable device), a PPE monitoring system in accordance with example embodiments of the disclosure is able to determine whether PPE items designated as being required for use in connection with a particular workstation or workstation equipment are within proximity to a worker when the worker is in proximity to the workstation or the specific workstation equipment. The PPE monitoring system is configured to make this determination by determining whether the user device receives a respective wireless signal from a respective wireless transmitting device associated with each such required PPE item at least partially concurrently with receipt of a wireless signal from a wireless transmitting device associated with the workstation or with a specific type of equipment. If all PPE items required to operate equipment at a workstation are not detected, the PPE monitoring system may initiate one or more safety actions such as, for example, triggering an alarm at the workstation, outputting an alert message via the user device, sending an alert message to one or more other devices, disabling equipment at the workstation, or the like.

Any of these safety actions that may be initiated by the PPE monitoring system constitute technical effects. Further, the context-aware, real-time monitoring capabilities of the PPE monitoring system constitute technical features that provide the capability to ensure compliance with PPE requirements as a worker moves through a workplace environment from one workstation to the next, thereby yielding an improvement to existing systems for monitoring use of PPE. A PPE monitoring system in accordance with example embodiments of the disclosure also provides the capability, via the use of various sensors, to determine whether a PPE item is actively being worn by a worker, thereby yielding another improvement to existing systems for monitoring use of PPE. It should be appreciated that the above examples of technical features, technical effects, and improvements to technology of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative PPE Monitoring System Operation

FIG. 1A schematically illustrates an example operation of a PPE monitoring system in accordance with one or more example embodiments of the disclosure, according to which the presence of all required PPE items for a workstation are detected and a UI indicating the presence of all required PPE items is presented to a worker via a user device. FIG. 1A depicts a workplace environment 102. The workplace environment 102 may include a worker 104 and a workstation 106. While a single worker 104 and a single workstation 106 is depicted in FIG. 1A, it should be appreciated that the workplace environment 102 may include multiple workers located at different positions in the workplace environment 102 (and potentially moving through the workplace environment 102) as well as multiple workstations located at different positions in the workplace environment 102.

The workplace environment 102 may further include various PPE items. While four example types of PPE items are depicted in FIG. 1A, it should be appreciated that any number and type of PPE items may be present in the workplace environment 102. Respective wireless transmitting devices 110(1)-110(4) may be attached or affixed to or otherwise physically associated with PPE items 108. In certain example embodiments, a respective wireless transmitting device may be physically associated with each PPE item present in the workplace environment 102.

The wireless transmitting devices 110(1)-110(4) may include any suitable device configured to transmit wireless signals in accordance with any suitable wireless communication protocol. For example, any of wireless transmission devices 110(1)-110(4) may be a low-power Bluetooth beacon configured to transmit wireless signals in accordance with the BLE protocol. As another example, any of wireless transmission devices 110(1)-110(4) may be a device configured to transmit wireless signals in accordance with an NFC protocol, an 802.11 wireless communication protocol, or the like. The terms communication protocol and communication standard may be used interchangeably herein.

A wireless transmitting device 112 may also be associated with the workstation 106. For example, the wireless transmitting device 112 may be attached or affixed to a piece of equipment associated with the workstation 106. In addition, a worker may utilize a user device 114 (e.g., a wearable device). The wearable device 114 may be configured to receive wireless signals from various wireless transmitting devices in the workplace environment 102, including the wireless transmitting devices 110(1)-110(4) and the wireless transmitting device 112. The wireless transmitting devices 110(1)-110(4), the wireless transmitting device 112, and the wearable device 114 may together form a personal area network (PAN) 116, such as in those example embodiments in which communication occurs in accordance with a Bluetooth standard (e.g., BLE). In other example embodiments, the wireless transmitting devices 110(1)-110(4), the wireless transmitting device 112, and the wearable device 114 may together form a local area network (LAN) 116, such as in those example embodiments in which communication occurs in accordance with an ad-hoc 802.11 standard (e.g., Wi-Fi Direct). Further, in certain example embodiments, such as those that utilize an infrastructure-based wireless communication standard, the wireless transmitting devices 110(1)-110(4) and 112 may transmit wireless signals to a wireless access point, and the access point may relay the signals to the wearable device 114.

In certain example embodiments, each wireless transmitting device 110(1)-110(4) may emit a wireless signal that includes an identifier linked to the particular type of PPE item to which the wireless transmitting device is attached. For example, the wireless transmitting device 110(4) physically associated with the safety googles depicted in FIG. 1A may emit wireless signals that include an identifier linked to safety googles, whereas the wireless transmitting device 110(1) physically associated with the safety helmet depicted in FIG. 1A may emit wireless signals that include an identifier linked to safety helmets. In certain example embodiments, the identifier included in a wireless signal transmitted by a wireless transmitting device attached to a PPE item may indicate a sub-type of the PPE item. For example, a different identifier may be linked to safety googles with filter lenses than an identifier linked to safety googles without filter lenses.

In other example embodiments, each wireless transmitting device 110(1)-110(4) may emit a wireless signal that includes an identifier that uniquely identifies the particular PPE item to which the wireless transmitting device is attached. For example, a wireless signal emitted by the wireless transmitting device 110(2) may include an identifier that uniquely identifies the particular pair of gloves with which the wireless transmitting device 110(2) is physically associated (e.g., gloves assigned to the worker 104). In this manner, wireless transmitting devices may be used to identify PPE items that are personalized for a particular worker (e.g., the worker 104), and thereby identify instances in which a worker may be utilizing the proper type or sub-type of PPE item, but an improper specific PPE item that is not tailored to that particular worker. For example, a PPE monitoring system in accordance with example embodiments of the disclosure may be able to detect when the worker 104 is utilizing a different worker's gloves rather than his/her own, which may present a safety hazard if the different worker's gloves do not property fit the hands of the worker 104.

As with the PPE items 108, the wireless transmitting device 112 located at the workstation 106 may emit a wireless signal that includes an identifier that identifies the type of workstation 106. For example, the wireless signal emitted by the wireless transmitting device 112 may identify the workstation 106 as an assembly station. In certain example embodiments, the wireless signal emitted by the wireless transmitting device 112 may uniquely identify a particular type of equipment capable of being operated at the workstation 106. For example, the wireless signal may include an identifier that uniquely identifies a welding machine in those example embodiments in which the workstation 106 is a welding station. In certain example embodiments, the wireless signal transmitted by the wireless transmitting device 112 may include an identifier that uniquely identifies a type of industrial process that may be performed at the workstation 106. For example, the identifier in the wireless signal may identify an arc welding process. In example embodiments in which multiple different types of industrial processes may be performed at the workstation 106 (e.g., arc welding and gas welding), distinct wireless transmitting devices may be attached to the different equipment for performing the different industrial processes. In this manner, the wireless signal transmitted by a wireless transmitting device attached to particular equipment may include an identifier that identifies the particular type of industrial process that may be performed using the particular equipment to which the wireless transmitting device is attached. It should also be appreciated that in other example embodiments, the wireless signal may include an identifier that uniquely identifies a particular workstation or a particular piece of equipment located at a particular position in the workplace environment 102.

An identifier may be linked to a particular type of PPE item or a specific PPE item itself as a result of being stored in a same data record of a database as another identifier of the PPE item or as a result of being stored in a first data record that is linked to a second data record that stores another identifier of the PPE item. For example, the identifier 98765 may be linked to a character string that identifies a particular type of PPE item (e.g., "work boots"). As another example, the identifier 28374 may be linked to the character string "gloves" that identifies a type of PPE item, and may be further linked to the character string "Jane Doe" that identifies the user to whom the specific PPE item has been assigned. For example, respective data fields of a same data record (or two or more linked data records) may be populated with the identifier 28374, the character string "gloves," and the character string "Jane Doe." In other example embodiments, an identifier retrieved from a wireless signal transmitted by a wireless transmitting device (e.g., the wireless transmitting device 110(3)) may include different segments that identify a type of the PPE item to which the wireless transmitting device is attached and a worker to whom the PPE item has been assigned. More specifically, for example, the identifier 12340001 may include a first portion "1234" that identifies the PPE item as "boots" and a second portion "0001" that is a user identifier that identifies the worker 104. As with the PPE items 108, an identifier included in a wireless signal received from the wireless transmitting device 112 may uniquely identify the workstation 106, the type of workstation 106, a particular piece of equipment located at the workstation 106, or a type of equipment located at the workstation 106 by virtue of being stored in a same data record as another identifier associated with the workstation 106 or the equipment (e.g., a character string representative of a name and/or location of the workstation 106 or equipment) or as a result of being stored in a first data record that is linked to a second data record that stores another identifier of the workstation 106 or the type of equipment.

The wearable device 114 may be configured to launch an application that includes computer-executable instructions, code, or the like that responsive to execution by one or more processing units (e.g., a microcontroller) of the wearable device 114 cause various operations to be performed. Such operations may include determining an identifier included in a wireless signal received from the wireless transmitting device 112 and accessing a datastore (e.g., a relational database) to determine the particular workstation 106 (e.g., workstation 4 located at coordinates (x,y) of the workplace environment 102), the type of the workstation 106 (e.g., a welding station), a particular piece of equipment located at the workstation 106 (e.g., welding machine having model number XYZ123), or a type of equipment located at the workstation 106 (e.g., a welding machine). Such operations may further include determining a set of one or more required PPE items associated with the workstation 106 generally or with specific equipment located at the workstation 106. For example, one or more data records stored in a datastore may associate a character string indicative of the type of workstation 106 (e.g., a welding station) with one or more character strings, each of which is indicative of a type of PPE item required to be worn by a worker operating equipment at a welding station. As another example, one or more data records stored in a datastore may associate a character string indicative of a particular type of equipment located at the workstation 106 (e.g., a welding machine) with character strings indicative of the type of PPE items required to be worn by a worker operating a welding machine. In yet other example embodiments, the identifier included in the wireless signal received from the wireless transmitting device 112 may itself be stored in association with character strings (or other identifiers) indicative of the types of PPE items to be worn by a worker operating equipment at the workstation 106.

The operations performed responsive to execution of computer-executable instructions, code, or the like by a microcontroller of the wearable device 114 may further include determining a respective identifier included in a respective wireless signal received from each of wireless transmitting devices 110(1)-110(4) and further determining the type of PPE item (e.g., safety goggles) to which each respective identifier corresponds. As previously described, each respective identifier may uniquely identify a particular type of PPE item or a particular PPE item itself.

After the required PPE items for the workstation 106 and the detected PPE items 108 have been determined, the operations may further include comparing the two sets of PPE items to determine whether the detected PPE items include all of the required PPE items. FIG. 1A depicts a scenario in which all required PPE items for the workstation 106 have been detected. For example, if the workstation 106 is a drilling station, the required PPE items may include a protective hard hat, gloves, boots, and safety googles. If the detected PPE items 108 include each of these required PPE items, the mobile application may generate and render a UI 118 on a display of the wearable device 114 that indicates the type of workstation 106, the PPE items required for the workstation 106, and a respective indication of the detected presence of each required PPE item. Further, in certain example embodiments, the mobile application may transmit a message or other signal to a workstation device instructing the workstation device to enable operation of equipment at the workstation 106. In other example embodiments, the mobile application may transmit a message or other signal to a back-end server, and the back-end server may remotely enable operation of equipment at the workstation 106, or may itself instruct the workstation device to enable operation of the equipment at the workstation 106.

In certain example embodiments, the mobile application executing on the wearable device 114 may determine a signal strength (e.g., an RSSI value) of a wireless signal received by the wearable device 114. If the RSSI value satisfies a threshold value, the mobile application may determine that the wireless transmitting device from which the wireless signal is received is in proximity to the wearable device 114, and thus, in proximity to the worker 104 wearing the wearable device 114. For example, for a wireless signal received from any of wireless transmitting devices 110(1)-110(4), the mobile application may assume that the worker 104 is wearing the corresponding PPE item if the RSSI value satisfies the threshold value, or alternatively, may assume that the worker 104 is not wearing the corresponding PPE item if the RSSI value does not satisfy the threshold value. Similarly, for a wireless signal received from the wireless transmitting device 112, the mobile application may assume that the worker 104 is in close enough proximity to the workstation 106 to operate equipment at the workstation 106 if the RSSI value satisfies the threshold value, and conversely, may assume that the worker 104 is not in close enough proximity to the workstation 106 to operate equipment if the RSSI value does not satisfy the threshold value.

In certain example embodiments, one or more sensors including, without limitation, an accelerometer, a gyroscope, a thermal sensor, a force sensor, or the like may be attached or affixed to a PPE item 108 in addition to a wireless transmitting device. The wireless transmitting device may be further configured to transmit sensor data collected by these sensor(s) to the mobile application. The mobile application may be configured to process the sensor data to determine with potentially greater accuracy than using the signal strength of the wireless signal received from the wireless transmitting device alone whether the PPE item 108 is currently being worn by the worker 104 or is merely in close proximity to the worker 104.

In certain example embodiments, the required PPE items for a particular type of workstation or a particular type of equipment operable at the workstation may include PPE items that provide the minimum required protection as specified by, for example, OSHA regulations. For any given type of required PPE item, however, a particular sub-type of PPE item may provide the minimum required protection, while other sub-types may provide enhanced protection, and thus, may also be acceptable. These other sub-types of PPE items that are acceptable may be specified as alternatives to the PPE item sub-type that at a minimum is required. For example, the one or more data records storing the association between a type of workstation or a type of equipment and the corresponding required PPE items may further specify, for one or more of the required PPE items, alternative PPE item sub-types that may provide enhanced protection, and thus, may be acceptable. For example, if safety googles without filter lenses is a minimum required PPE item sub-type for the workstation 106 or equipment at the workstation 106, then if safety googles with filter lenses are detected in proximity to the worker 104 when the worker 104 is in proximity to the workstation 106, the safety googles requirement may be deemed met. In such an example embodiment, the UI 118 displayed on the wearable device 114 may indicate the minimum required PPE item sub-type as being detected (e.g., safety googles without filter lenses) or the actual PPE item sub-type that was detected (e.g., safety googles with filter lenses). If, however, safety googles with filter lenses is the minimum required PPE item sub-type, then detection of safety google without filter lenses would not satisfy the requirement, and this particular required PPE item would be indicated as not being present.

Further, in certain example embodiments, a first PPE item type may provide a first level of protection and a second different PPE item type may provide a second level of protection that protects against everything that the first level of protection protects against and more. For example, a welding helmet provides enhanced protection as compared to safety googles. Thus, if safety googles is a required PPE item for a workstation, a welding helmet would necessarily be an acceptable alternative. Accordingly, in various example embodiments, one or more alternative PPE item types may be specified as acceptable in lieu of a required PPE item type, such that if any of the alternative PPE item types are detected when a worker is in proximity to the workstation 106, the requirement for the corresponding required PPE item type may be deemed met even if the required PPE item type is not detected.

Figure 1B:
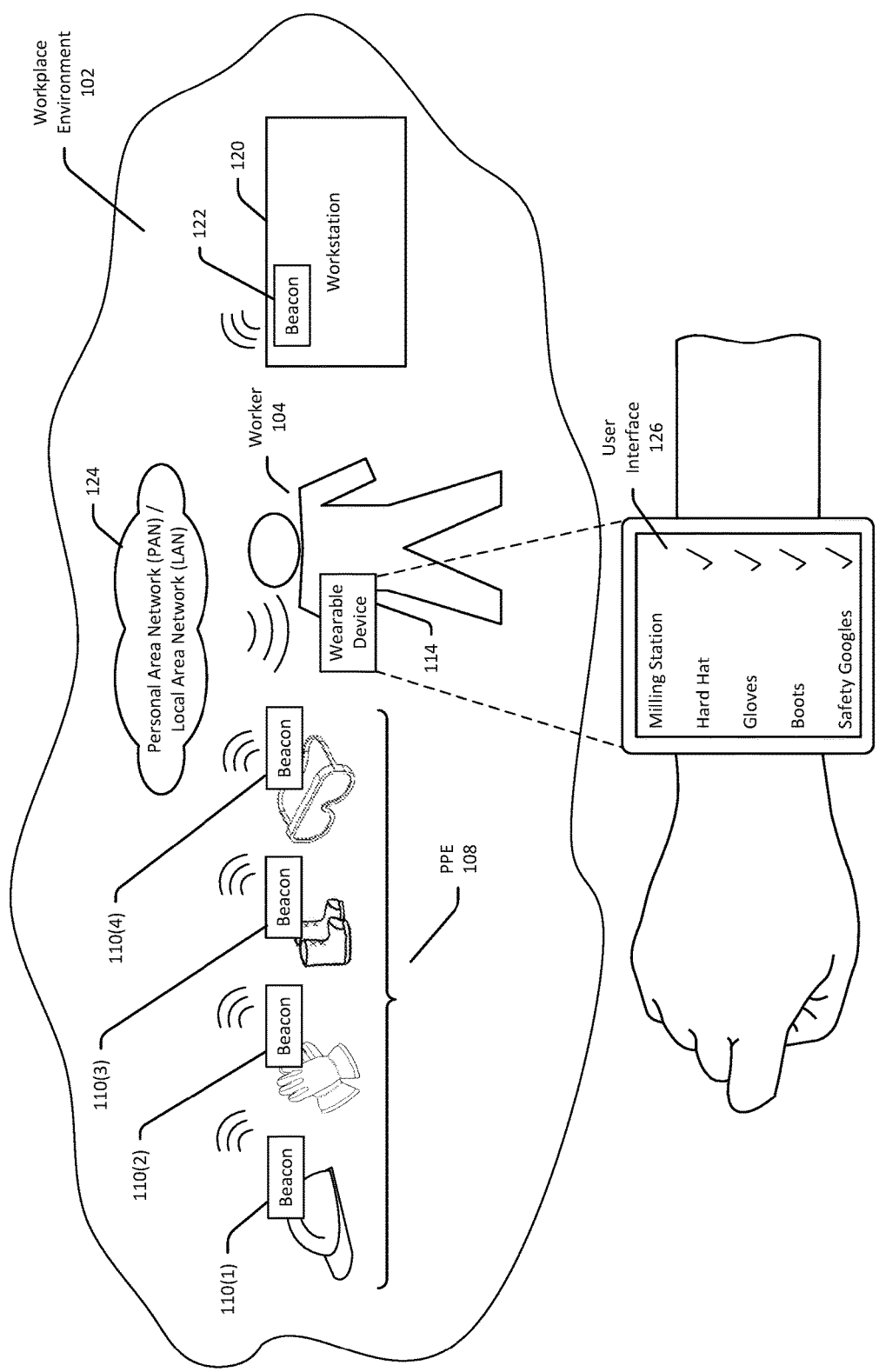

FIG. 1B schematically depicts a scenario in which the worker 104 has moved to within proximity of a different workstation (e.g., workstation 120). A wireless transmitting device 122 may be present at the workstation 120. For example, the wireless transmitting device 122 may be attached to a piece of equipment at the workstation 120, in which case, the wireless transmitting device 122 may emit a wireless signal that includes an identifier that uniquely identifies the particular workstation 120, the type of workstation 120, the particular piece of equipment to which the wireless transmitting device 122 is attached, or the type of equipment to which the wireless transmitting device 122 is attached. Alternatively, the wireless transmitting device 122 may simply be present in the workstation 122 (e.g., attached to a wall), in which case, the identifier in the wireless signal transmitted by the wireless transmitting device 122 may only indicate the particular workstation 120 or the type of workstation 120. Similar to the scenario depicted in FIG. 1A, the wireless transmitting devices 110(1)-110(4), the wireless transmitting device 122, and the wearable device 114 may form a PAN or LAN 124.

The PPE monitoring system may again perform the process described earlier to determine whether all required PPE items for the workstation 120 or equipment at the workstation 120 are detected when the worker 104 is in proximity to the workstation 120 and may display a UI 126 on the wearable device 114 that indicates each required PPE item and whether or not it was detected. For example, the workstation 120 may be a milling station. The same PPE items may be required to operate equipment at a milling station (or simply be present at the milling station) as are required for a drilling station. As such, upon detection of each of the PPE items 108 when the worker 104 is in proximity to the workstation 120, the UI 126 may be displayed on the wearable device, indicating that each required PPE item has been detected.

Figure 1C:
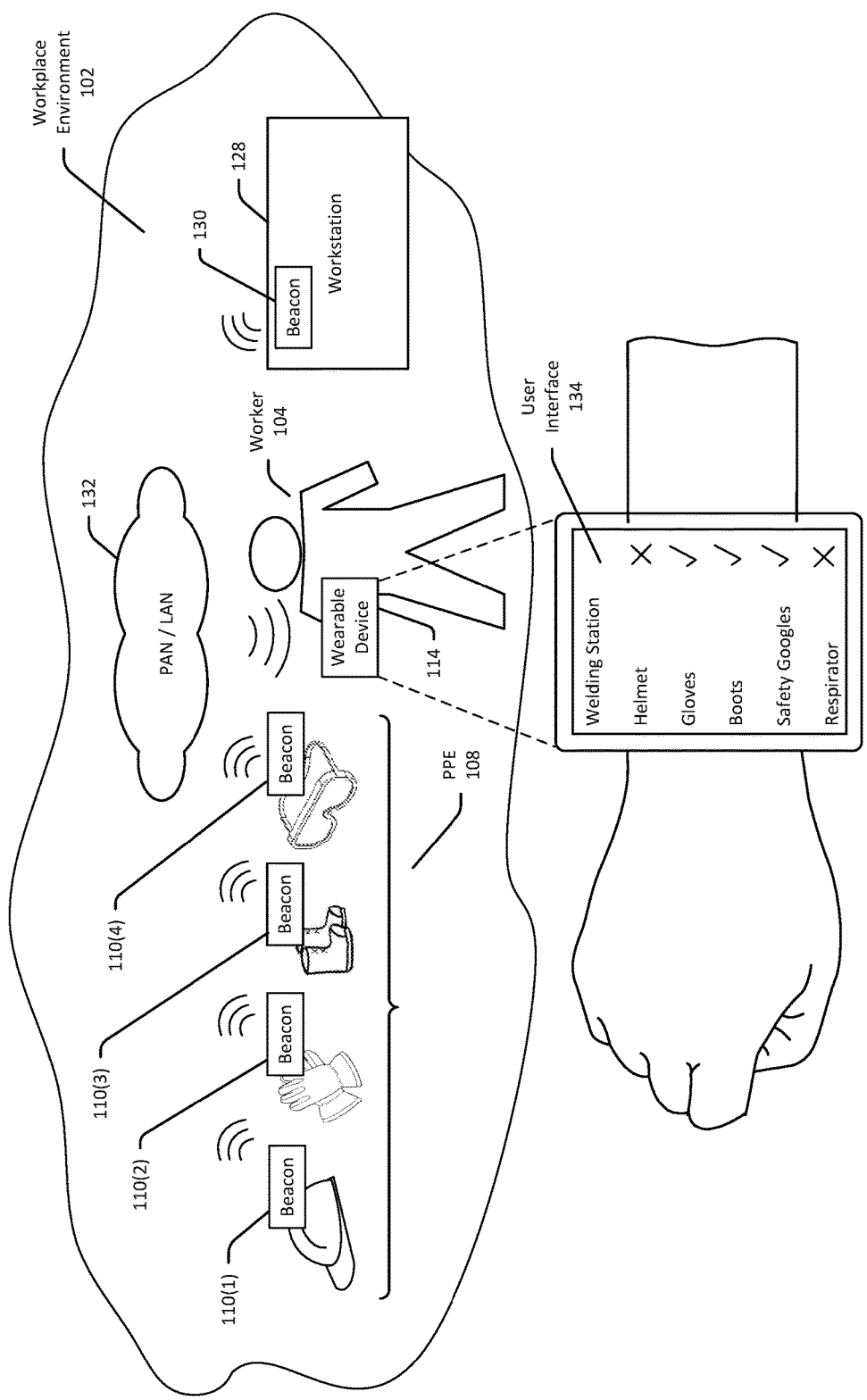
FIG. 1C schematically illustrates another example operation of a PPE monitoring system in accordance with one or more example embodiments of the disclosure, according to which a PPE item designated as being required for a third workstation is not detected when the worker is in proximity to the third workstation and an indication of the absence of the required PPE item is presented to the worker via the user device.

FIG. 1C schematically illustrates another example operation of a PPE monitoring system in accordance with one or more example embodiments of the disclosure, according to which a required PPE item for a workstation is not detected and a UI indicating the absence of the required PPE item is presented to the worker 104 via the wearable device 114. The workplace environment 102 shown in FIGS. 1A and 1B is again depicted in FIG. 1C. The scenario depicted in FIG. 1C may temporally follow the scenario depicted in FIG. 1B, which in turn, may temporally follow the scenario depicted in FIG. 1A. The worker 104 may have moved from the workstation 120, and may now be in proximity to a workstation 128. As previously described, a mobile application executing on the wearable device 114 utilized by the worker 104 may determine that the worker 104 is in proximity to the workstation 128 based on a signal strength of a wireless signal received by the wearable device 114 from a wireless transmitting device 130 associated with the workstation 128. The wearable device 114 may further detect the presence of the PPE items 108 in proximity to the worker 104 based on the respective signal strengths of wireless signals received from the wireless transmitting devices 110(1)-110(4) respectively attached or affixed to the PPE items 108. As similarly described in connection with FIGS. 1A and 1B, the wireless transmitting devices 110(1)-110(4), the wireless transmitting device 130, and the wearable device 114 may together form, at least in part, a PAN 128 or a LAN 128.

As previously described, the wearable device 114 may be configured to launch an application that includes computer-executable instructions, code, or the like that responsive to execution by one or more processing units (e.g., a microcontroller) of the wearable device 114 cause various operations to be performed. Such operations may include determining an identifier included in a wireless signal received from the wireless transmitting device 130 and accessing a datastore (e.g., a relational database) to determine the particular workstation 128 (e.g., workstation 7 located at coordinates (x1,y1) of the workplace environment 102), the type of the workstation 128 (e.g., a welding station), a particular piece of equipment located at the workstation 128 (e.g., welding machine having model number XYZ123), or a type of equipment located at the workstation 128 (e.g., a welding machine). Such operations may further include determining a set of one or more required PPE items associated with the workstation 128 generally or with specific equipment located at the workstation 128.

The operations may further include determining a respective identifier included in a respective wireless signal received from each of wireless transmitting devices 110(1)-110(4) and further determining the type of PPE item to which each respective identifier corresponds. As previously described, each respective identifier may uniquely identify a particular type of PPE item or a particular PPE item itself. After the required PPE items for the workstation 128 and the detected PPE items 108 have been determined, the operations may further include comparing the two sets of PPE items to determine whether the detected PPE items include all of the required PPE items. FIG. 1C depicts a scenario in which all required PPE items for the workstation 130 have not been detected. For example, if the workstation 106 is a welding station, the required PPE items may include a welding helmet, gloves, boots, safety googles, and a respirator. FIG. 1C depicts a scenario in which the required welding helmet and respirator have not been detected. In such an example scenario, the mobile application may generate and render a UI 134 on a display of the wearable device 114 that indicates the type of workstation 128, the PPE items required for the workstation 128, and a respective indication of the detected presence or absence of each required PPE item. In the example scenario depicted in FIG. 1C, the required welding helmet and respirator are indicated as being absent while the other required PPE items are indicated as being present.

FIGS. 1A-1C together depict the context-aware operation of a PPE monitoring system in accordance with example embodiments of the disclosure. In particular, as the worker 104 moves from one workstation to the next during her/his shift, the determination of required PPE items, the detection of PPE items, and the comparison may be performed at each workstation, thereby providing real-time monitoring of worker compliance with PPE requirements and real-time indications of compliance or non-compliance.

Figure 2:
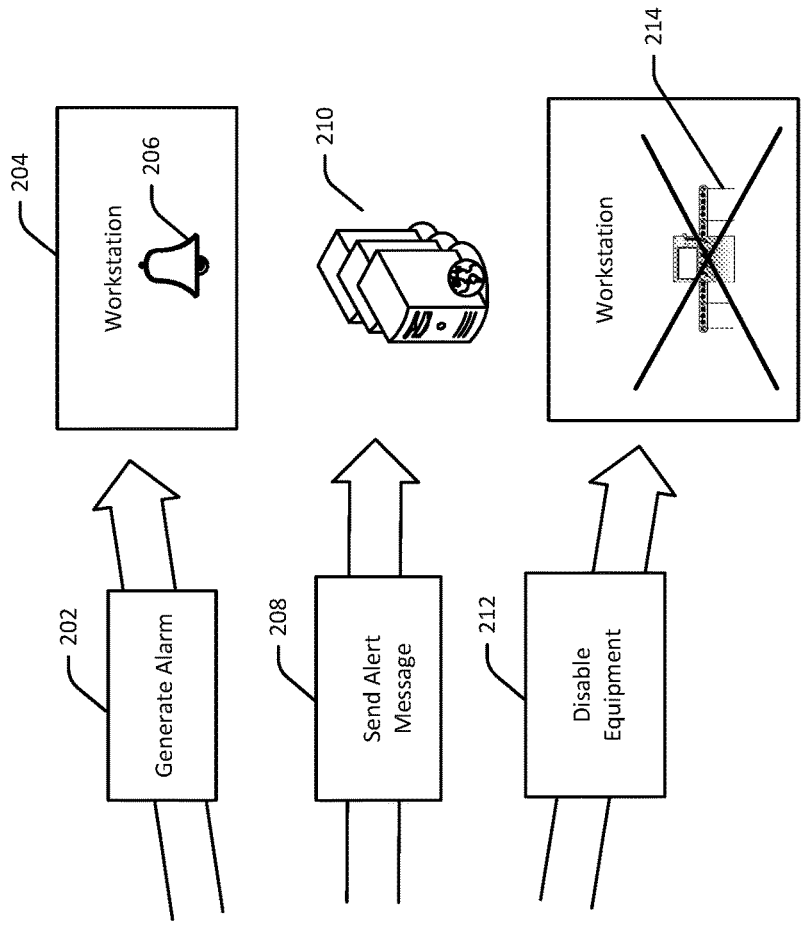
FIG. 2 depicts example safety actions that may be initiated after a PPE monitoring system in accordance with one or more example embodiments of the disclosure determines that a required PPE item is not present.

FIG. 2 depicts example safety actions that may be initiated after a PPE monitoring system in accordance with one or more example embodiments of the disclosure determines that a required PPE item for a workstation 204 is not present such as, for example, in the scenario depicted in FIG. 1B. The workstation 204 may correspond to, for example, the workstation 106. For example, as depicted in FIG. 2, the mobile application executing on a wearable device (e.g., the wearable device 122) may instruct the wearable device to transmit 202 a wireless signal that causes an alarm 206 (e.g., an audible alarm) to sound at the workstation 204. The alarm 206 may inform an individual (e.g., a safety compliance officer) in the workplace environment 102 of a potential PPE-related safety violation. In certain example embodiments, the wearable device may transmit the signal directly to a receiving component at the workstation 204 (which may be a wireless transmitting device (e.g., the wireless transmitting device 112) or another device) or may transmit the signal to a back-end server (not shown), and the back-end server may, in turn, send a signal to a workstation receiving component to cause the alarm 206 to sound.

As another example safety action that may be initiated, the mobile application may transmit an alert message 208 to a computer 210 at the workstation 204 for presentation to one or more workers present at the workstation 204. The alert message may include textual, graphical, audio, and/or video content. The alert message may indicate which required PPE item(s) have not been detected and the worker to whom the alert message relates. The mobile application may determine the worker based on the user profile that is logged into the mobile application on the wearable device. In other example embodiments, the mobile application may transmit a notification to a back-end server (not shown) that identifies the workstation and the PPE item(s) that were not detected, and the back-end server may transmit the alert message to the computer 210 at the workstation 204.

Figure 3:
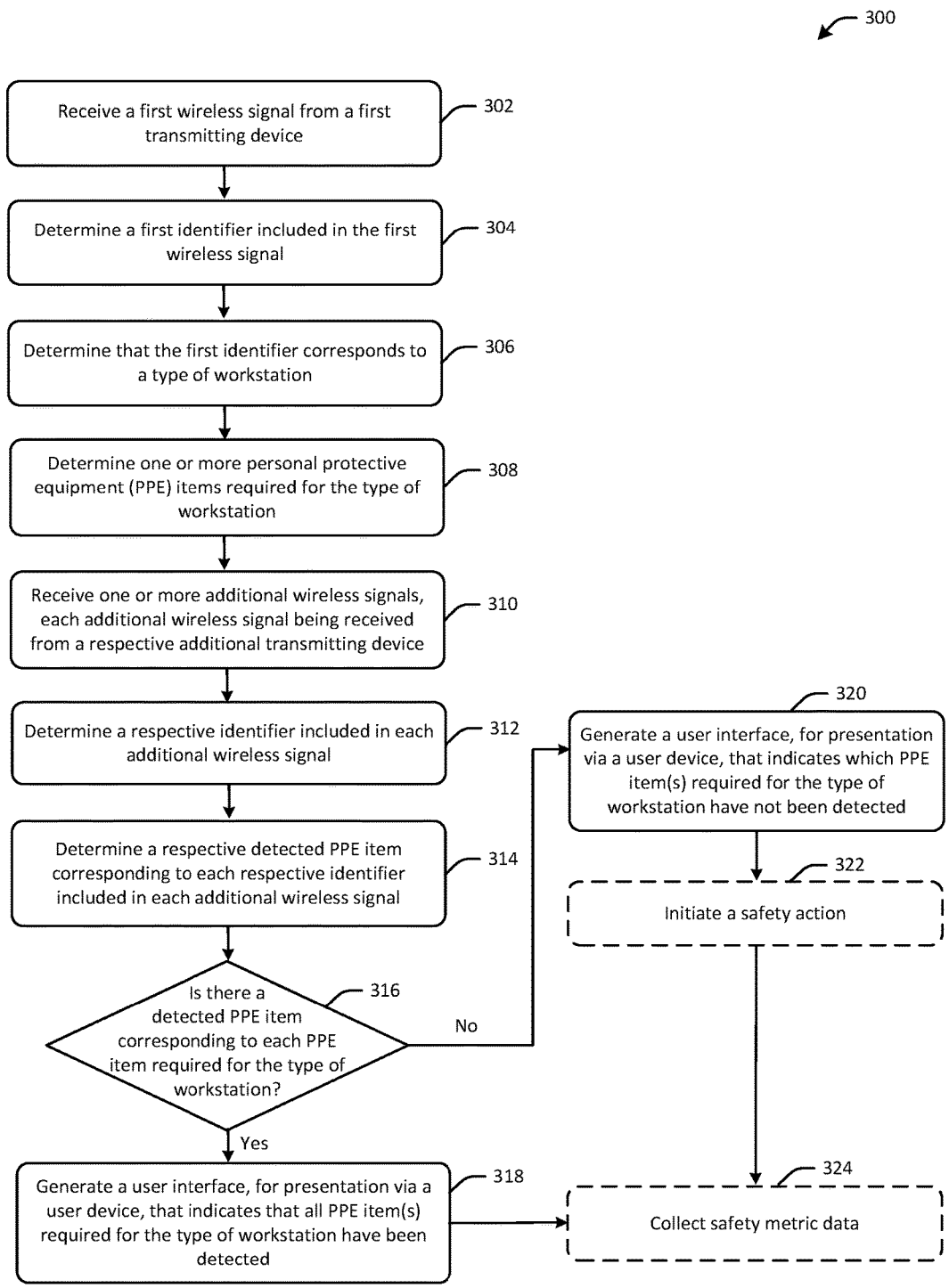
FIG. 3 is a process flow diagram of an illustrative method for determining the presence or absence of PPE items designated as being required for a workstation in accordance with one or more example embodiments of the disclosure.

As yet another example of a safety action that may be initiated, the PPE monitoring system may cause equipment at the workstation 204 to become inoperable. For example, upon receipt of the alert message described earlier, a protocol 212 may be initiated to disable all equipment at the workstation 204. The equipment may be disabled until a subsequent message is received that indicates that all required PPE items have been detected or that the non-compliant worker is no longer within proximity to the workstation 204. A worker may be determined to no longer be within proximity to the workstation 204 if, for example, a wireless signal from a wireless transmitting device at the workstation 2404 is no longer being received by the wearable device of the non-compliant worker or the signal strength of any such received wireless signal does not satisfy a threshold value. In other example embodiments, if the workstation 204 includes different pieces of equipment for which different combinations of PPE items have been designated as required, only those piece(s) of equipment for which at least one required PPE item has not been detected may be disabled. In this manner, a worker may continue to operate equipment for which all required PPE items have been detected even if the workstation 204 includes additional equipment for which all required PPE items have not been detected Illustrative Processes FIG. 3 is a process flow diagram of an illustrative method 300 for determining the presence or absence of PPE items designated as being required for a workstation in accordance with one or more example embodiments of the disclosure. While one or more operations of the method 300 may be described hereinafter as being performed by a mobile application executing on a user device (e.g., a wearable device), or more specifically, responsive to execution of computer-executable instructions of the mobile application by one or more processing units of the user device, it should be appreciated that any operation of the method 300 may be performed, at least in part, by one or more back-end servers.

At block 302, a wearable device utilized by a worker in a workplace environment may receive a first wireless signal from a first transmitting device. The first transmitting device may be, for example, a wireless transmitting device associated with a workstation (e.g., a wireless transmitting device attached or affixed to a piece of equipment located at the workstation).

At block 304, a mobile application executing on the wearable device may determine a first identifier included in the first wireless signal. For example, the first transmitting device may be a low-power beacon that utilizes BLE proximity sensing to transmit a wireless signal that includes a universally unique identifier.

At block 306, the mobile application may determine that the first identifier corresponds to a type of workstation. For example, the mobile application may access a locally stored datastore (e.g., a relational database) or query a remote datastore to determine the type of workstation (e.g., an assembly station) to which the first identifier corresponds. In other example embodiments, the mobile application may determine that the first identifier corresponds to a particular workstation (e.g., workstation 2 located at coordinates (x,y) of a workplace environment), a particular piece of equipment located at a particular workstation (e.g., an assembly machine having model number XYZ123), or a type of equipment located at a workstation (e.g., an assembly machine).

At block 308, the mobile application may determine a set of one or more required PPE items associated with the type of workstation generally or with specific equipment located at the workstation. For example, one or more data records stored in a datastore may associate a character string indicative of the type of workstation (e.g., an assembly station) with one or more character strings, each of which is indicative of a type of PPE item required to be worn by a worker operating equipment at an assembly station. As another example, one or more data records stored in a datastore may associate a character string indicative of a particular type of equipment located at the workstation (e.g., an assembly machine) with character strings indicative of the type of PPE items required to be worn by a worker operating an assembly machine. In yet other example embodiments, the first identifier may itself be stored in association with character strings (or other identifiers) indicative of the types of PPE items to be worn by a worker operating equipment at the type of workstation to which the first identifier corresponds.

At block 310, the wearable device may receive one or more additional wireless signals. Each additional wireless signal may be received from a respective additional wireless transmitting device. Each additional wireless device may be attached or affixed to a corresponding PPE item. At block 312, the mobile application may determine a respective identifier included in each additional wireless signal. At block 314, the mobile application may determine a respective type of PPE item to which each respective identifier corresponds. As previously described, each respective identifier may uniquely identify a particular type of PPE item or a particular PPE item itself.

After the required PPE items for the type of workstation and the detected PPE items have been determined, the mobile application may compare the two sets of PPE items to determine, at block 316, whether the detected PPE items include all of the required PPE items. In response to a positive determination at block 316, which indicates that have all required PPE items have been detected, the mobile application may generate a UI for presentation via the wearable device at block 318. The UI may indicate the type of workstation, each required PPE item for the type of workstation, and the detected presence of each required PPE item. For example, the UI generated at block 318 may include a check mark or other indicator rendered in association with each required PPE item that indicates the detected presence of each required PPE item.

On the other hand, in response to a negative determination at block 316, the mobile application may generate an alternate UI for presentation via the wearable device at block 320. The UI generated at block 320 may also indicate the type of workstation and each required PPE item for the type of workstation. However, in contrast to the UI generated at block 318, the UI generated at block 320 may indicate those required PPE item(s) whose presence has been detected as well as those PPE item(s) who presence has not been detected. For example, the UI generated at block 320 may include an 'X' or other indicator rendered in association with each required PPE item whose presence has not been detected.

From block 320, the method 300 may optionally proceed to block 322, where one or more safety actions may be initiated. The safety actions may include any of the types of actions described in reference to FIG. 2. In addition, the method 300 may optionally proceed to block 324 from block 318, block 320, or block 322. At block 324, the mobile application may collect safety metric data. The safety metric data may include an identification of the type of workstation, an indication as to whether the worker's visit to the workstation was compliant or non-compliant (e.g., whether all required PPE items were detected), an indication of which required PPE item(s) were not detected if the visit was non-compliant, or the like. In certain example embodiments, the safety metric data may be aggregated with previously safety metric data collected for the worker and/or with safety metric data associated with other workers.

Aggregate safety metric data for any given worker may indicate, without limitation, the number of workstation visits during which the worker was compliant with PPE requirements (e.g., the number of instances in which all required PPE items were detected when the worker was determined to be in proximity to a workstation); the number of workstation visits during which the worker was non-compliant with PPE requirements (e.g., the number of instances in which at least one required PPE item was not detected when the worker was within proximity to a workstation); identification of the workstation corresponding to each compliant workstation visit; identification of the workstation corresponding to each non-compliant workstation visit; identification of those PPE item(s) that were not detected during each non-compliant workstation visit; a number of instances in which a previously undetected required PPE item was subsequently detected within a threshold period of time after providing an indication of the missing required PPE item via the wearable device used by the worker; a number of instances or a percentage of time that a PPE item was not being worn by the worker (as potentially determined from additional sensor data as described earlier); and so forth. While certain metrics have been described above as being represented by integer values, it should be appreciated that any suitable representation (e.g., percentage of workstation visits during which a worker was compliant with PPE requirements) may be used for any metric.

The safety metric data associated with a worker may be made accessible to the worker via the mobile application executable on the wearable device. In certain example embodiments, other workers may be incentivized to comply with PPE use requirements by rewarding those workers who demonstrate higher rates of compliant use of PPE with increased income, more vacation days, or the like. Additionally, or alternatively, aggregate safety metric data for a group of workers may be processed to determine safety trends, correlate PPE use to workplace incident rates, generate reports, or the like. Further, aggregate safety metric data may be presented to the workers in an anonymous format so as to indicate overall compliance with PPE use requirements without providing an indication of the particular compliance rates of any particular worker.

Figure 4:
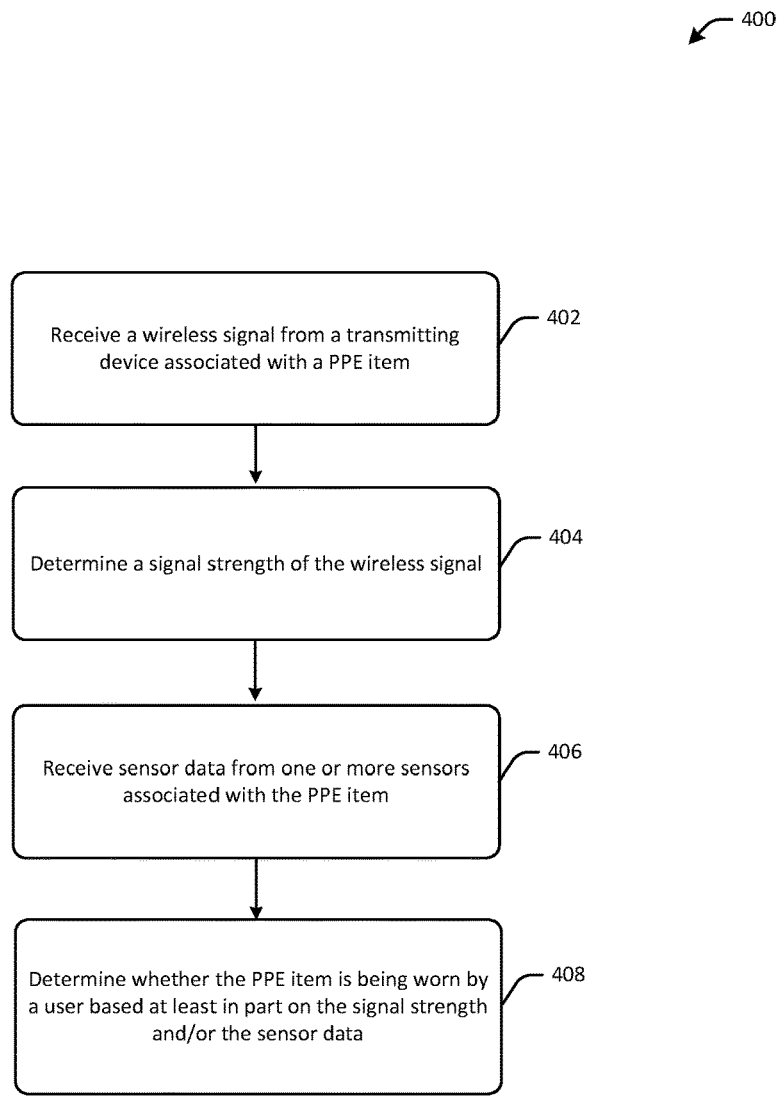
FIG. 4 is a process flow diagram of an illustrative method for determining whether a PPE item is being worn by a worker in accordance with one or more example embodiments of the disclosure.

FIG. 4 is a process flow diagram of an illustrative method 400 for determining whether a PPE item is being worn by a worker in accordance with one or more example embodiments of the disclosure. While one or more operations of the method 400 may be described hereinafter as being performed by a mobile application executing on a user device (e.g., a wearable device), or more specifically, responsive to execution of computer-executable instructions of the mobile application by one or more processing units of the user device, it should be appreciated that any operation of the method 400 may be performed, at least in part, by one or more back-end servers.

At block 402, a wearable device may receive a wireless signal from a wireless transmitting device associated with a PPE item. At block 404, a mobile application executing on the wearable device may determine a signal strength (e.g., an RSSI value) of the wireless signal. In certain example embodiments, if the RSSI value satisfies a threshold value, the mobile application may determine that the wireless transmitting device from which the wireless signal is received is in sufficient proximity to the wearable device to justify an assumption that the worker is wearing the PPE item. However, in various example scenarios, even if the signal strength of the wireless signal indicates close proximity to the PPE item to the worker, the worker may not be wearing the PPE item. For example, the PPE item (e.g., a helmet) may be placed on a table next to where the worker is seated.

As such, in certain example embodiments, one or more sensors including, without limitation, an accelerometer, a gyroscope, a thermal sensor, a force sensor, or the like may be attached or affixed to a PPE item in addition to the wireless transmitting device. Sensor data collected by these sensors may be used in conjunction with the signal strength of the wireless signal, or as alternative thereto, to determine with potentially greater accuracy whether the worker is actually wearing the PPE item. More specifically, the wireless transmitting device may be further configured to receive sensor data collected by these sensor(s) and transmit the sensor data to the mobile application. The mobile application may receive the sensor data at block 406. At block 408, the mobile application may be configured to process the sensor data to determine whether the PPE item is currently being worn by the worker or is merely in close proximity to the worker. For example, if the accelerometer or gyroscope data is indicative of continuous movement for at least a threshold period of time, the mobile application may determine that the PPE item is being worn.

Illustrative Networked Architecture

Figure 5:
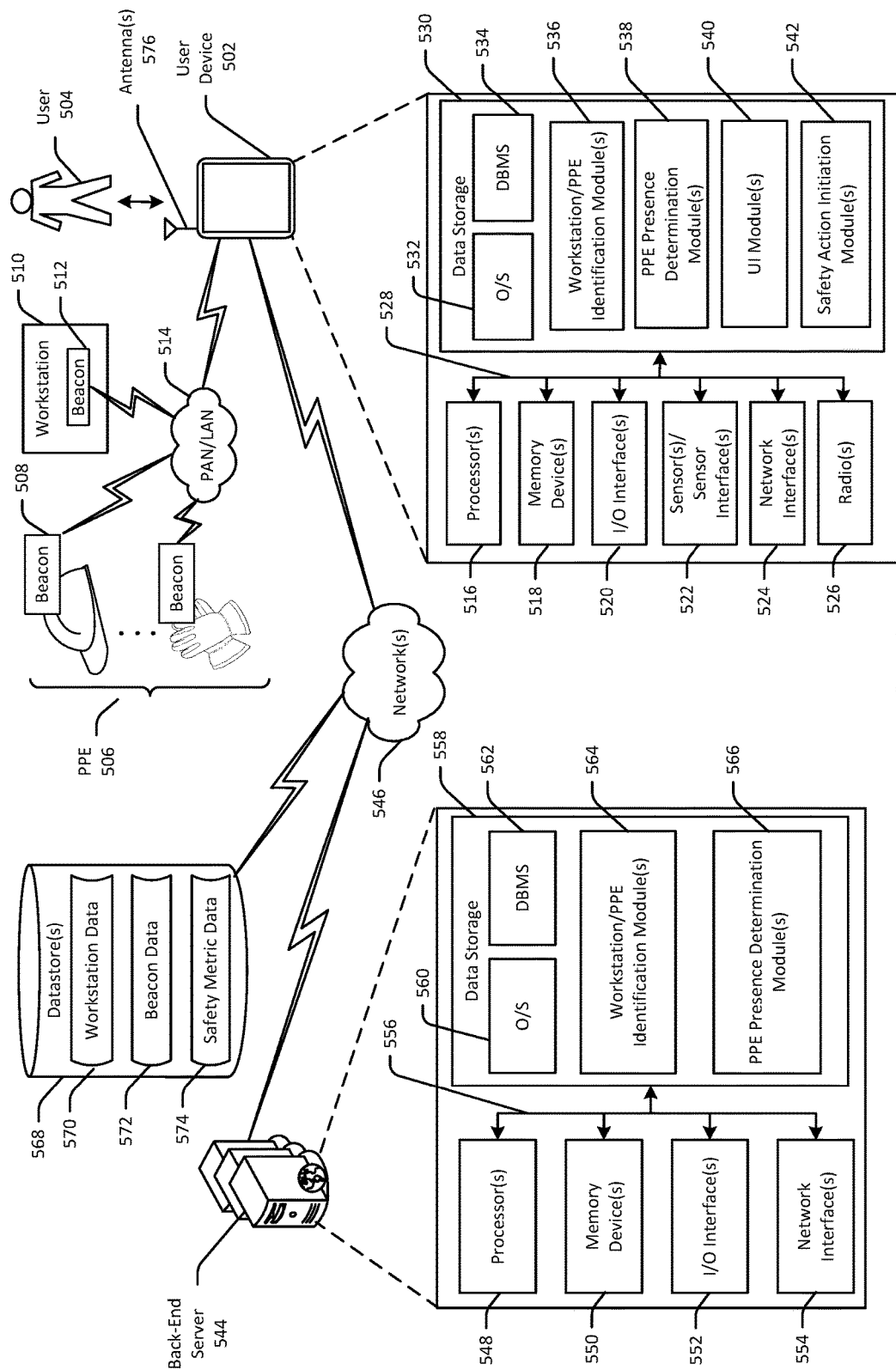
FIG. 5 is a schematic diagram of an illustrative networked architecture in accordance with one or more example embodiments of the disclosure.

FIG. 5 is a schematic diagram of an illustrative networked architecture 500 in accordance with one or more example embodiments of the disclosure. The networked architecture 500 may include one or more user devices 502 (e.g., wearable devices), each of which may be utilized by a corresponding user 504. The networked architecture 500 may further include a respective one or more wireless transmitting devices 512 associated with each of one or more workstations 510 located in a workplace environment. In addition, the networked architecture 500 may include a respective wireless transmitting device 508 associated with each PPE item present in the workplace environment. The networked architecture 500 may further include one or more back-end servers 544 and one or more datastores 568.

Any given user device 502 may form, at least in part, a PAN 514 or LAN 514 with one or more wireless transmitting devices 508 and/or one or more wireless transmitting devices 512. In addition, a user device 502 may be configured to communicate with the back-end server 544 and/or access the datastore(s) 568 via one or more networks 546. The network(s) 546 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 546 may have any suitable communication range associated therewith and may include, for example, global networks (e.g., the Internet), metropolitan area networks (MANS), wide area networks (WANs), local area networks (LANs), or personal area networks (PANs). In addition, the network(s) 546 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof. Although not depicted in FIG. 5, a wireless transmitting device 508 and/or a wireless transmitting device 512 may also be configured to communicate with a user device 502 and/or a back-end server 544 via one or more of the network(s) 546. Further, the LAN 514 and/or any of the network(s) 546 may be secured using any suitable encryption algorithms including, but not limited to, Wired Equivalent Privacy (WEP), Wi-Fi Protected Access (WPA), WPA2, or the like. If WEP is used, a 64-bit, 128-bit, 152-bit, or 256-bit WEP key may be used.

In an illustrative configuration, the user device 502 may include one or more processors (processor(s)) 516, one or more memory devices 518 (generically referred to herein as memory 518), one or more input/output ("I/O") interface(s) 520, one or more sensors or sensor interfaces 522, one or more network interfaces 524, one or more radios 526, and data storage 530. The device 502 may further include one or more buses 528 that functionally couple various components of the device 502. The device 502 may further include one or more antennas 576 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 528 may include at least one of a system bus, a memory bus, an address bus, or a message bus, and may permit exchange of information (e.g., data (including computer-executable code), signaling, etc.) between various components of the device 502. The bus(es) 528 may include, without limitation, a memory bus or a memory controller, a peripheral bus, an accelerated graphics port, and so forth. The bus(es) 528 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 518 of the device 502 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 518 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 518 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 530 may include removable storage and/or non-removable storage including, but not limited to, magnetic storage, optical disk storage, and/or tape storage. The data storage 530 may provide non-volatile storage of computer-executable instructions and other data. The memory 518 and the data storage 530, removable and/or non-removable, are examples of computer-readable storage media (CRSM) as that term is used herein.

The data storage 530 may store computer-executable code, instructions, or the like that may be loadable into the memory 518 and executable by the processor(s) 516 to cause the processor(s) 516 to perform or initiate various operations. The data storage 530 may additionally store data that may be copied to memory 518 for use by the processor(s) 516 during the execution of the computer-executable instructions. Moreover, output data generated as a result of execution of the computer-executable instructions by the processor(s) 516 may be stored initially in memory 518, and may ultimately be copied to data storage 530 for non-volatile storage.

More specifically, the data storage 530 may store one or more operating systems (O/S) 532; one or more database management systems (DBMS) 534; and one or more program modules, applications, engines, computer-executable code, scripts, or the like such as, for example, one or more workstation/PPE identification modules 536, one or more PPE presence determination modules 538, one or more UI modules 540, and one or more safety action initiation modules 542. Any of the components depicted as being stored in data storage 530 may include any combination of software, firmware, and/or hardware. The software and/or firmware may include computer-executable code, instructions, or the like that may be loaded into the memory 518 for execution by one or more of the processor(s) 516.

The workstation/PPE identification module(s) 536 may include computer-executable code, instructions, or the like that responsive to execution by one or more of the processor(s) 516 may cause operations to be performed for determining an identifier included in a wireless signal received from a wireless transmitting device (e.g., a wireless transmitting device 508 and/or a wireless transmitting device 512) and accessing one or more of the datastore(s) 568 to determine a type of PPE item, a particular PPE item itself, a particular workstation, a type of workstation, a particular piece of equipment at a particular workstation, or a type of equipment to which the identifier corresponds. The workstation/PPE identification module(s) 536 may further include computer-executable code, instructions, or the like that responsive to execution by one or more of the processor(s) 516 may cause operations to be performed for accessing one or more of the datastore(s) 568 to determine a set of required PPE items associated with a particular workstation, a type of workstation, a particular piece of equipment, or a type of equipment. It should be appreciated that one or more of the datastore(s) 568 may be locally stored on the user device 502.

The PPE presence determination module(s) 538 may include computer-executable code, instructions, or the like that responsive to execution by one or more of the processor(s) 516 may cause operations to be performed for comparing a set of required PPE items to a set of detected PPE items to determine whether the set of detected PPE includes all of the required PPE items.

The UI module(s) 540 may include computer-executable code, instructions, or the like that responsive to execution by one or more of the processor(s) 516 may cause operations to be performed for receiving an indication, from the PPE presence determination module(s) 538, of the presence or absence of each required PPE item in a set of required PPE items and generating a corresponding UI that indicates the presence or absence of each required PPE item.

The safety action initiation module(s) 542 may include computer-executable code, instructions, or the like that responsive to execution by one or more of the processor(s) 516 may cause operations to be performed for receiving an indication, from the PPE presence determination module(s) 538, of the absence of at least one required PPE item and initiating one or more safety actions, which may include any of the safety actions described in reference to FIG. 2.

The data storage 530 may further store various types of data utilized by components of the device 500. Any data stored in the data storage 530 may be loaded into the memory 518 for use by the processor(s) 516 in executing computer-executable code. In addition, any data depicted as being stored in the data storage 530 may potentially be stored in one or more of the datastores 568 and may be accessed via the DBMS 534 and loaded in the memory 518 for use by the processor(s) 516 in executing computer-executable code.

The processor(s) 516 may be configured to access the memory 518 and execute computer-executable instructions loaded therein. For example, the processor(s) 516 may be configured to execute computer-executable instructions of the various program modules, applications, engines, or the like of the user device 502 to cause or facilitate various operations to be performed in accordance with one or more embodiments of the disclosure. The processor(s) 516 may include any suitable processing unit capable of accepting data as input, processing the input data in accordance with stored computer-executable instructions, and generating output data. The processor(s) 516 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 516 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 516 may be capable of supporting any of a variety of instruction sets.

Referring now to other illustrative components depicted as being stored in the data storage 530, the O/S 532 may be loaded from the data storage 530 into the memory 518 and may provide an interface between other application software executing on the device 502 and hardware resources of the device 500. More specifically, the O/S 532 may include a set of computer-executable instructions for managing hardware resources of the device 502 and for providing common services to other application programs (e.g., managing memory allocation among various application programs). In certain example embodiments, the O/S 532 may control execution of one or more of the program modules depicted as being stored in the data storage 530. The O/S 532 may include any operating system now known or which may be developed in the future including, but not limited to, any server operating system, any mainframe operating system, or any other proprietary or non-proprietary operating system.

The DBMS 534 may be loaded into the memory 518 and may support functionality for accessing, retrieving, storing, and/or manipulating data stored in the memory 518 and/or data stored in the data storage 530. The DBMS 534 may use any of a variety of database models (e.g., relational model, object model, etc.) and may support any of a variety of query languages. The DBMS 534 may access data represented in one or more data schemas and stored in any suitable data repository. In certain example embodiments, the DBMS 534 may be any suitable light-weight DBMS optimized for performance on a mobile device.

The datastore(s) 568 may include, but are not limited to, databases (e.g., relational, object-oriented, etc.), file systems, flat files, distributed datastores in which data is stored on more than one node of a computer network, peer-to-peer network datastores, or the like. The datastore(s) 568 may store various types of data such as, for example, workstation data 570, wireless transmitting device data 572, and safety metric data 574. The workstation data 570 may include data indicating correspondences between identifiers and workstations or equipment located at workstations. The workstation data 570 may further include data that identifies PPE items required for each workstation, type of workstation, piece of equipment, or type of equipment. The wireless transmitting device data 572 may include data indicating correspondences between identifiers and type of PPE items or particular PPE items themselves. The safety metric data may 574 may include data relating to any of the types of safety metrics previously described.

Referring now to other illustrative components of the device 502, the input/output (I/O) interface(s) 520 may facilitate the receipt of input information by the device 502 from one or more I/O devices as well as the output of information from the device 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 502 or may be separate. The I/O devices may further include, for example, any number of peripheral devices such as data storage devices, printing devices, and so forth.

The I/O interface(s) 520 may also include an interface for an external peripheral device connection such as universal serial bus (USB), FireWire, Thunderbolt, Ethernet port or other connection protocol that may connect to one or more networks. The I/O interface(s) 520 may also include a connection to one or more of the antenna(s) 576 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 502 may further include one or more network interfaces 524 via which the device 502 may communicate with any of a variety of other systems, platforms, networks, devices, and so forth. The network interface(s) 524 may enable communication, for example, with the wireless transmitting devices 508 and/or the wireless transmitting devices 510 via the network(s) 514. The network interface(s) 524 may further enable communication, for example, with the back-end server 544 via the network(s) 546.

The antenna(s) 576 may include any suitable type of antenna depending, for example, on the communications protocols used to transmit or receive signals via the antenna(s) 576. Non-limiting examples of suitable antennas may include directional antennas, non-directional antennas, dipole antennas, folded dipole antennas, patch antennas, multiple-input multiple-output (MIMO) antennas, or the like. The antenna(s) 576 may be communicatively coupled to one or more radio components 526 to which or from which signals may be transmitted or received.

As previously described, the antenna(s) 576 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 576 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 576 may be configured to transmit or receive radio frequency signals within any suitable frequency range forming part of the unlicensed portion of the radio spectrum.

The antenna(s) 576 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The radio(s) 526 may include any suitable radio component(s) for—in cooperation with the antenna(s) 576—transmitting or receiving radio frequency (RF) signals in the bandwidth and/or channels corresponding to the communications protocols utilized by the device 502 to communicate with other devices. The radio(s) 526 may include hardware, software, and/or firmware for modulating, transmitting, or receiving—potentially in cooperation with any of antenna(s) 576—communications signals according to any of the communications protocols discussed above including, but not limited to, one or more Bluetooth communication protocols, one or more Wi-Fi and/or Wi-Fi direct protocols, as standardized by the IEEE 802.11 standards, one or more non-Wi-Fi protocols, or one or more cellular communications protocols or standards. The radio(s) 526 may further include hardware, firmware, or software for receiving GNSS signals. The radio(s) 526 may include any known receiver and baseband suitable for communicating via the communications protocols utilized by the device 500. The radio(s) 526 may further include a low noise amplifier (LNA), additional signal amplifiers, an analog-to-digital (A/D) converter, one or more buffers, a digital baseband, or the like.

The sensor(s)/sensor interface(s) 522 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

Referring now to the back-end server 544, in an illustrative configuration, the back-end server 544 may include one or more processors (processor(s)) 548, one or more memory devices 550 (generically referred to herein as memory 550), one or more input/output ("I/O") interface(s) 552, one or more network interfaces 554, and data storage 558. The back-end server 544 may further include one or more buses 556 that functionally couple various components of the back-end server 544.

The bus(es) 556 may include any of the types of bus(es) or bus architectures described in reference to the bus(es) 528. Further, the processor(s) 548 may include any of the types of processors described in reference to the processor(s) 516, the memory 550 may include any of the types of memory described in reference to the memory 518, the data storage 558 may include any of the types of data storage described in reference to the data storage 530, the I/O interface(s) 552 may include any of the types of I/O interfaces described in reference to the I/O interface(s) 520, and the network interface(s) 554 may include any of the types of network interfaces described in reference to the network interface(s) 524. The network interface(s) 554 may enable network communication with a user device 502 via the network(s) 546.

The data storage 558 may store one or more operating systems (O/S) 560; one or more database management systems (DBMS) 562; and one or more program modules, applications, engines, computer-executable code, scripts, or the like such as, for example, one or more workstation/PPE identification modules 564 and one or more PPE presence determination modules 566. Any of the components depicted as being stored in data storage 558 may include any combination of software, firmware, and/or hardware. The software and/or firmware may include computer-executable code, instructions, or the like that may be loaded into the memory 550 for execution by one or more of the processor(s) 548. The O/S 560 may include any of the types of operating systems described in reference to the O/S 532 and the DBMS 562 may include any of the types of database management systems described in reference to the DBMS 534. In addition, the workstation/PPE identification module(s) 564 and the PPE presence determination module(s) 566 may include respective computer-executable code, instructions, or the like that responsive to execution by one or more of the processor(s) 548 may cause operations to be performed similar to those described in connection with similar named modules of the user device 502. Further, while not depicted in FIG. 5, the back-end server 544 may further include program modules that perform functionality similar to that described in connection with the UI module(s) 540 and/or the safety action initiation module(s) 542.

It should be appreciated that the program modules, applications, computer-executable instructions, code, or the like depicted in FIG. 5 as being stored in the data storage 530 and/or the data storage 558 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 500, the back-end server 544, and/or hosted on other computing device(s) accessible via one or more of the network(s) 546, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the device 502 and/or the back-end server 544 may include alternate and/or additional hardware, software, or firmware components beyond those described or depicted without departing from the scope of the disclosure. More particularly, it should be appreciated that software, firmware, or hardware components depicted as forming part of the device 502 and/or the back-end server 544 are merely illustrative and that some components may not be present or additional components may be provided in various embodiments. While various illustrative program modules have been depicted and described as software modules stored in data storage 530 and/or the data storage 558, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 300 and 400 may be performed by a device 502, by a back-end server 544, or in a distributed fashion by a device 502 and a back-end server 544 having the illustrative configuration depicted in FIG. 5, or more specifically, by one or more engines, program modules, applications, or the like executable on such device(s). It should be appreciated, however, that such operations may be implemented in connection with numerous other device configurations.

The operations described and depicted in the illustrative methods of FIGS. 3 and 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3 and 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for local monitoring of personal protective equipment (PPE), comprising:
   receiving, by a receiver of a wearable user device, a first identifier included in a first Bluetooth wireless signal received directly from a first wireless transmitting device coupled to a workstation equipment in proximity to the user device;
   determining a first personal protective equipment (PPE) item type designated as being required for safety compliance to operate the workstation equipment based on the first identifier;
   receiving, by the receiver of the wearable user device, a second identifier included in a second Bluetooth wireless signal received directly from a second wireless transmitting device coupled to a first PPE item;
   determining that the first PPE item is associated with the first PPE item type;
   monitoring a signal strength of the second Bluetooth wireless signal;
   on a condition that the signal strength falls below a threshold value that corresponds to a threshold distance from the wearable user device, rendering, via the wearable user device a real-time indication of safety non-compliance for the first PPE item type.

2. The method of claim 1, further comprising:
   receiving a third Bluetooth wireless signal directly from the second wireless transmitting device;
   determining that the second identifier is included in the third wireless signal;
   monitoring a signal strength of the third Bluetooth wireless signal; and
   on a condition that the signal strength of the third Bluetooth wireless signal satisfies the threshold value, displaying, via the wearable user device, a real-time indication of safety compliance for the first PPE item type.

3. The method of claim 2, the method further comprising:
   determining all PPE item types designated as being required for the workstation equipment;
   detecting presence of all PPE item types designated as being required for the workstation equipment, based on monitored signal strength of each of a plurality of Bluetooth wireless signals satisfying the threshold value; and
   transmitting an instruction to enable operation of the workstation equipment.

4. The method of claim 1, further comprising initiating a safety action in response to determining that the first PPE item type is non-compliant.

5. The method of claim 4, wherein the safety action comprises disabling the workstation equipment.

6. A wearable user device for local monitoring of personal protective equipment (PPE), comprising:
   at least one memory storing computer-executable instructions; and
   at least one processor configured to access the at least one memory and execute the computer-executable instructions to:
   receive a first identifier included in a first Bluetooth wireless signal received directly from a first wireless transmitting device coupled to a workstation equipment in proximity to the wearable user device;
   determine a first personal protective equipment (PPE) item type designated as being required for safety compliance to operate the workstation equipment based on the first identifier;
   receive a second identifier included in a second Bluetooth wireless signal from a second wireless transmitting device coupled to a first PPE item;
   determine that the first PPE item is associated with the first PPE item type;
   monitor a signal strength of the second Bluetooth wireless signal;
   on a condition that the signal strength falls below a threshold value that corresponds to a threshold distance from the wearable user device, render a real-time indication of safety non-compliance for the first PPE item type.

7. The wearable user device of claim 6, wherein the at least one processor is further configured to execute the computer-executable instructions to:

receive a third Bluetooth wireless signal from the second wireless transmitting device;
determine that the second identifier is included in the third Bluetooth wireless signal;
monitor a signal strength of the third Bluetooth wireless signal; and
on a condition that the signal strength of the third Bluetooth wireless signal satisfies the threshold value, render a real-time indication of safety compliance for the first PPE item type.

8. The wearable user device of claim 7, wherein the at least one processor is further configured to execute the computer-executable instructions to:
determine all PPE items types designated as being required for the workstation equipment;
detect presence of all PPE item types designated as being required for the workstation equipment, based on monitored signal strength of each of a plurality of Bluetooth wireless signals satisfying the threshold value; and
transmit an instruction to enable operation of the workstation equipment.

9. The wearable user device of claim 6, wherein the second identifier is uniquely associated with a particular worker.

10. The wearable user device of claim 6, wherein the at least one processor is further configured to execute the computer-executable instructions to initiate a safety action in response to determining that the first PPE item type is non-compliant.

11. The wearable user device of claim 10, wherein the safety action comprises disabling the workstation equipment.

12. A personal protective equipment (PPE) monitoring system, comprising:
a plurality of wireless transmitting devices including a first wireless transmitting device coupled to a workstation equipment, a second wireless transmitting device coupled to a first PPE item; and
a wearable user device comprising:
at least one memory storing computer-executable instructions; and
at least one processor operatively coupled to the at least one memory and configured to access the at least one memory and execute the computer-executable instructions to:
receive a first identifier included in a first Bluetooth wireless signal received directly from the first wireless transmitting device;
determine a first PPE item type designated as being required for safety compliance to operate the workstation equipment based on the first identifier;
receive a second identifier included in a second Bluetooth wireless signal from the second wireless transmitting device;
determine that the first PPE item is associated with the first PPE item type;
monitor a signal strength of the second Bluetooth wireless signal;
on a condition that the signal strength falls below a threshold value that corresponds to a threshold distance from the wearable user device, render a real-time indication of safety non-compliance for the first PPE item type.

13. The system of claim 12, wherein the at least one processor is further configured to execute the computer-executable instructions to:
receive a third Bluetooth wireless signal directly from the second wireless transmitting device;
determine that the second identifier is included in the third wireless signal;
monitor a signal strength of the third Bluetooth wireless signal; and
on a condition that the signal strength of the third Bluetooth wireless signal satisfies the threshold value, display, via the wearable user device, a real-time indication of safety compliance for the first PPE item type.

14. The system of claim 12, wherein the at least one processor is further configured to execute the computer-executable instructions to:
detect presence of all PPE item types designated as being required for the workstation equipment based on monitored signal strength of each of a plurality of Bluetooth wireless signals satisfying the threshold value; and
transmit an instruction to enable operation of the workstation equipment.

15. The system of claim 12, wherein the at least one processor is further configured to execute the computer-executable instructions to initiate a safety action in response to determining that the first PPE item type is non-compliant, wherein the safety action comprises disabling the workstation equipment.

* * * * *